J. F. Carroll,
Canvas Stretcher.
No. 80,135.   Patented July 21, 1868.
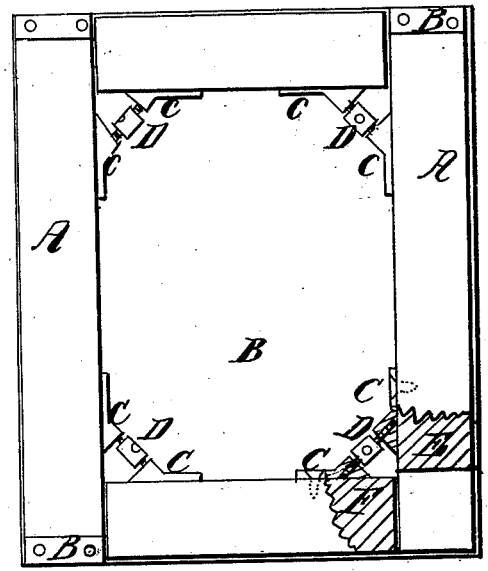
Witnesses
Wm A. Morgan
Theo Insche
Inventor:
Joseph F. Carroll
Per Murry
Attorneys

United States Patent Office.

JOSEPH F. CARROLL, OF SOUTH BOSTON, MASSACHUSETTS.

Letters Patent No. 80,135, dated July 21, 1868.

ARTISTS' STRETCHING-FRAME.

The Schedule referred to in these Letters Patent and making part of the same.

TO ALL WHOM IT MAY CONCERN:

Be it known that I, JOSEPH F. CARROLL, of South Boston, in the county of Suffolk, and State of Massachusetts, have invented a new and improved Device for Spreading-Frames; and I do hereby declare that the following is a full, clear, and exact description thereof, which will enable those skilled in the art to make and use the same, reference being had to the accompanying drawings, forming part of this specification.

This invention relates to an improvement over all methods heretofore employed for spreading artists frames, and thereby stretching the canvas thereon; and it consists in applying a right and left-hand screw to each of the corners of the frame, whereby the sides of the frame which are thus operated upon are moved simultaneously, as will be hereinafter more fully described.

The drawing represents the back side of an artist's frame (with canvas attached) provided with my expanding-screws for spreading the frame and stretching the canvas, the view being partly in section, to show the screw, and the manner of its operation on the frame.

A represents the frame, which may be halved or tenoned together at the corners in the ordinary manner.

B represents the canvas, which is nailed to the frame, as usual.

My device for spreading the frame consists of two brackets and a screw for each corner.

The brackets are marked C, and are securely fastened to the sides of the frame. They are drilled, and a screw-thread cut in each, a right-hand thread in one and a left-hand thread in the other at each corner.

D is the screw, and the threads on its ends are cut to correspond with the threads in the brackets, so that when the screw is turned in one direction, the brackets will be forced from each other, and when the screw is turned in the other direction, the brackets will be drawn toward each other.

It will be seen that in the former instance (and taking the sectional corner for an example) the parts E and F of the frame would be spread or expanded, and so with each corner in succession.

The central portion of the screws (between the threads) is perforated with holes, as seen in the drawing, for affording facilities for turning them with an awl or other suitable instrument, or they may be left square, so as to be turned with a wrench or otherwise.

These screws, being thus fitted to the brackets, act as braces and stiffen the frame, thereby greatly adding to its durability and usefulness.

I claim as new, and desire to secure by Letters Patent—

Spreading or expanding artists' frames by a right and left-hand screw, substantially in the manner herein shown and described.

JOSEPH F. CARROLL.

Witnesses:
WM. C. CULVER,
H. SCHROFF.